United States Patent [19]

Neuwirth et al.

[11] 3,989,901

[45] Nov. 2, 1976

[54] OPTIONAL TELEPHONE ANSWERING SYSTEM

[75] Inventors: Marvin R. Neuwirth, Syosset; Warren C. Hubbs, Bellport; Edward A. Murphy, Dix Hills, all of N.Y.

[73] Assignee: Message Center Systems, Inc., New York, N.Y.

[22] Filed: Apr. 30, 1975

[21] Appl. No.: 573,346

[52] U.S. Cl............................. 179/6 E; 179/27 FH; 179/84 C
[51] Int. Cl.².......................................... H04M 1/64
[58] Field of Search............... 179/27 FH, 6 R, 6 E, 179/84 C, 6 AC, 6 C, 89, 2 A

[56] References Cited
UNITED STATES PATENTS

| | | | |
|---|---|---|---|
| 2,979,568 | 4/1961 | Logan | 179/6 E |
| 3,187,108 | 6/1965 | Clin et al. | 179/84 C |
| 3,793,487 | 2/1974 | Kilby | 179/6 E |
| 3,858,006 | 12/1974 | Tomita | 179/6 E |

Primary Examiner—Thomas A. Robinson

[57] ABSTRACT

An optional telephone answering system is connected in parallel with the telephone of a subscriber. When the subscriber does not answer a call the system is operated. At first an announcement is delivered to the caller telling him if he wishes to leave a recorded message he should speak after hearing a first tone but if he wishes to speak to a line operator he should wait to hear a second tone and then request the operator. At the end of the announcement a recording unit is energized. If the caller then starts talking the recording unit stays energized recording the caller's voice signals. The recording unit is deenergized at the end of the message. If the caller did not start talking a second tone is generated a given time after the first tone and the recording unit is deenergized. When the caller now gives an indication by voice or dial signaling, the answer service operator is called onto the line to take the message.

4 Claims, 5 Drawing Figures

OPTIONAL TELEPHONE
ANSWERING SYSTEM

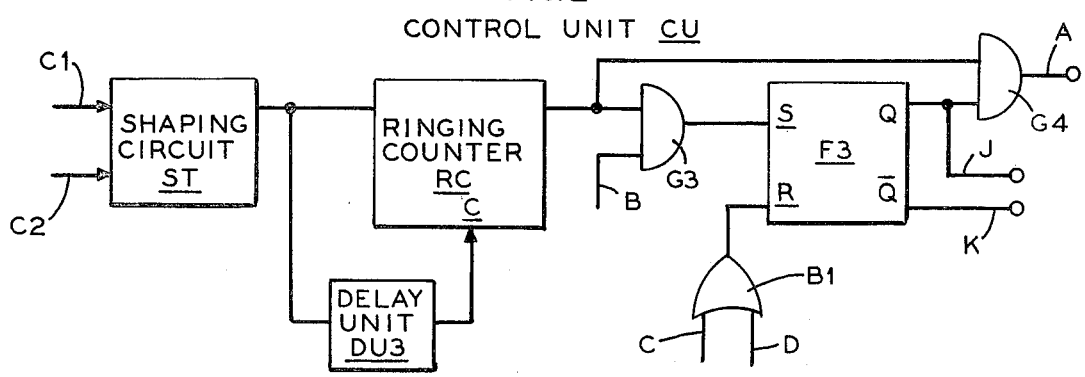
FIG. 2
CONTROL UNIT CU
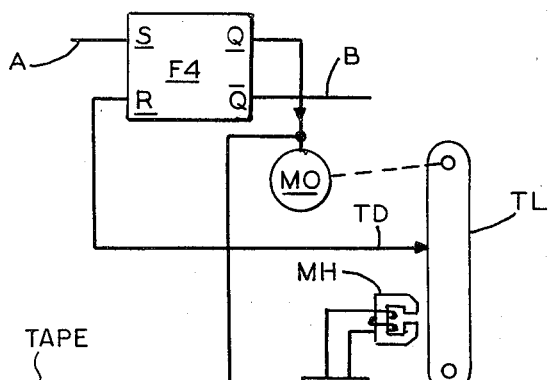
FIG. 3
ANNOUNCING UNIT AU
FIG. 5
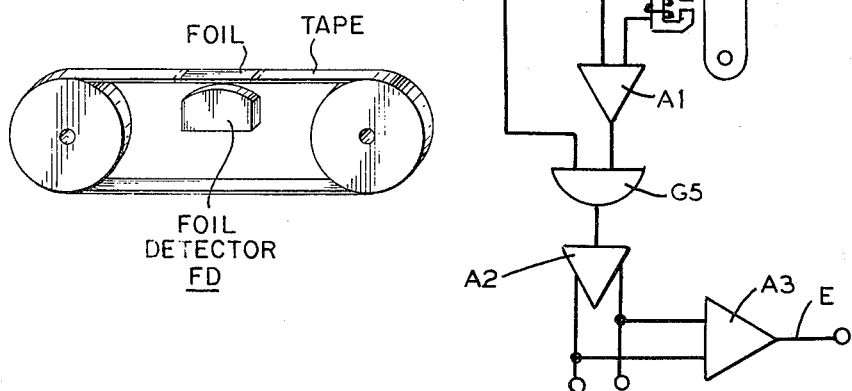
FIG. 4
OPERATOR POSITION OP
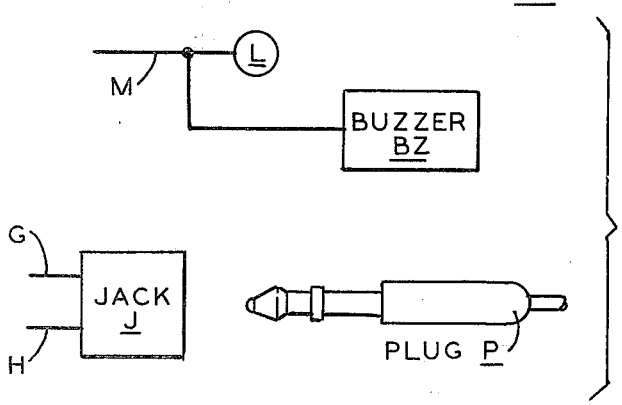

OPTIONAL TELEPHONE ANSWERING SYSTEM

This invention pertains to telephone systems and more particularly to the automatic answering of unattended telephones.

The answering of unattended telephones falls into two different classes. The first class utilizes answering equipment wherein the caller is told the called person is not available but the caller can leave a message which will be magnetically recorded. This class generally requires the expenditure of a one time charge for the cost of the equipment and perhaps a nominal monthly charge for a coupler to the telephone line. While such a system may be inexpensive it is clearly impersonal, and, in fact, experience has shown many callers refuse to leave a message they know is being magnetically recorded.

The other class utilizes live operators who are connected in parallel with the subscriber's telephone. While the use of such operators personalizes the service, the cost of the service becomes more expensive and for many calls an operator is not needed.

It is accordingly an object of the present invention to provide an improved telephone answering system. It is another object of the invention to provide an improved telephone answering system which has the advantages of both the magnetic recording system and the operator system.

These and other objects are obtained by a telephone answering apparatus which is connected in parallel with a subscriber's line and also to an answer service operator position so that a calling party can converse with an operator, but, which also includes recording equipment so that the calling party can leave a message that is recorded. There is also provided control equipment to give the calling party the option of picking which type of communication he wishes to utilize.

Other objects, features and advantages of the invention will be apparent from the following detailed description when read with the accompanying drawing which shows a presently preferred embodiment. In the drawing:

FIG. 2 is a logic diagram of a control unit in the system of FIG. 1;

FIG. 3 is a logic diagram of an announcing unit in the system of FIG. 1;

FIG. 4 is a schematic diagram of an operator station in the system of FIG. 1; and FIG. 5 shows the endless tape with foil section and the foil detector.

Figure 1:
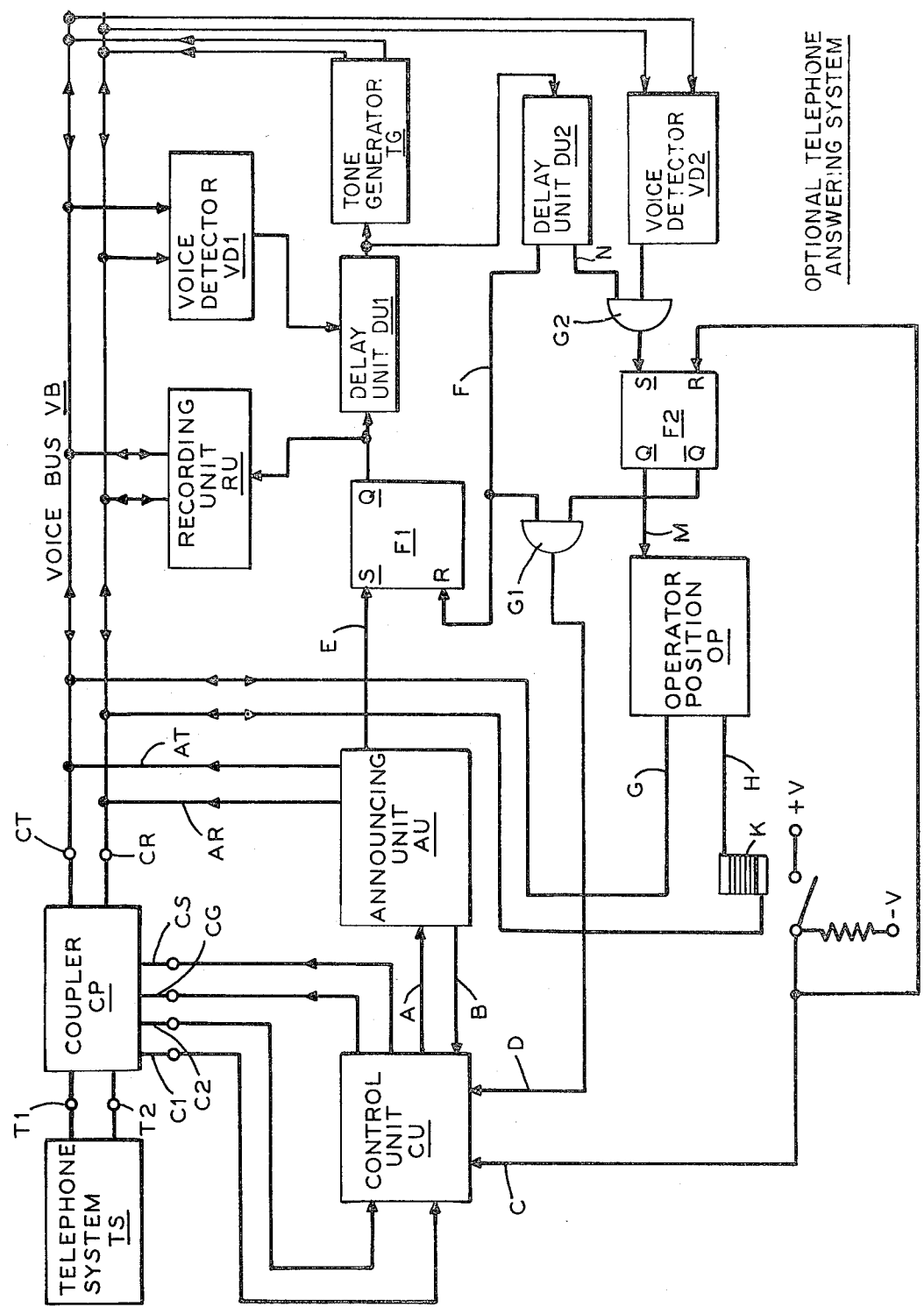
FIG. 1 is a block diagram of an optional telephone answering system in accordance with the invention.

The system may be connected into the regular dial telephone network or may be connected to an interconnected telephone communication system.

In particular, the main station of the telephone to be provided the service of this system can be located at a distant point from the answering system. The system may also be connected via separate line to the terminals of a subscriber's line at the telephone central office or by separate line to the answering system, where applicable, when serving internally within an inter-connected telephone communication system.

Thus, the system is connected in parallel with the subscriber's telephone or main station in an internal telephone system just as with conventional operator type answering services.

As shown in FIG. 1, the optional telephone answering system is connected to the dial network or telephone system TS via a protection device module where and when necessary which may be provided by, for example, the American Telephone and Telegraph Corp. and having the part identification CD-6 or by other independent manufacturing sources.

The coupler CP has two terminals T1 and T2 which are connected to the subscriber's lines and six terminals which are used for interfacing with the answer service apparatus. In addition the coupler CP has a line seizure relay. In this way, the dial network is protected from damage due to malfunctioning of any apparatus connected thereto. The coupler CP has two terminals CT and CR which are connected to the two-wire voice bus VB. It is on these wires and via the terminals CT and CR that all voice and tone communication takes place. The coupler CP has two output terminals C1 and C2 for feeding ringing signals to control unit CU (hereinafter more fully described) and for receiving therefrom line seizure control signals at terminals CS and CG.

In operation, whenever a subscriber is called, the ringing signals are also detected by coupler CP and fed to control unit CU. If the subscriber doesn't answer his telephone by the third ring control unit CU which has been counting ring signals emits a pulse on line A to announcing unit AU. In addition it sends signals to terminals CS and CG to activate the line seizure relay in the coupler CP to "answer" the call. Announcing unit AU which will hereinafter be more fully described includes an announcement generator which when activated transmits an announcement via lines AR and AT to voice bus VB. The announcement in essense tells the caller that the subscriber he is calling is not available and would the caller like to leave a message. The caller is given the options of (1) leaving a message which will be magnetically recorded, or (2) speaking directly to an operator. In addition, the announcement tells the caller if he wishes to leave a message to be recorded he should start talking immediately after he hears a first tone at the end of the announcement. However, if the caller wishes to talk to a live operator he should wait until he hears a second tone 7 seconds after the first tone.

At the end of the announcement the announcing unit AU transmits the first tone onto voice bus VB and also transmits a signal on line E to set flip-flop F1 for activating recording unit RU which can be a conventional tape recorder used in unattended telephone answering equipment. The audio circuits of the unit are connected to voice bus VB to pick up the message. Of course the recording unit RU does have automatic playback facilities which allow the subscriber to hear his recorded messages. But, since the playback portions do not form part of the present invention they will not be described.

At the same time the recording unit RU is activated, the signal from flip-flop F1 energizes delay unit DU which will emit a signal from its output seven seconds later unless there is a signal present on its second input connected to the output of voice detector VD1 which senses for talking on the voice bus VB. If such a signal is present delay unit DU will not emit its signal until after the signal from voice detector VD1 has disappeared. Delay unit DU1 can be a controlled retriggerable delay multivibrator.

Assume for the present that the caller wants to leave a recorded message, then his talking is sensed by voice detector VD1 which need only be an amplifier tuned to say 1KHZ. Thus delay unit DU1 is temporarily inhibited. After his talking has stopped for seven seconds delay unit DU emits a pulse which is fed to tone generator TG (which is not important at this time) and to delay unit DU2 which, after 5 seconds, emits a pulse on line F to reset flip-flop F1 and via AND-circuit G1 and line D to control unit CU. The signal on line D causes control unit CU to stop sending signals on lines CG and CS to cause deactivation of the line seizure relay ending the call.

If the caller wanted to speak to the operator he would have remained silent after the first tone. Therefore, at the end of seven seconds delay unit DU1 would emit the pulse which energizes tone generator TG and triggers delay unit DU2 as before. Delay unit in addition to emitting the pulse on line F after 5 seconds, emits a gate signal on line N during the 5 second interval. Now, tone generator TG, which can be a voltage controlled oscillator controlled by a one shot multivibrator, transmits the second tone onto the voice bus VB. When the caller hears the second tone he says "I want to speak to the operator". This message is sensed by voice detector VD2 (similar to detector VD1) which transmits a signal to an input of AND-circuit G2. Note instead of having the caller speak the above or a similar sentence, the announcement could request him to dial the number 9 on his handset. Then, instead of using the voice detector VD2 there would be two detectors in parallel, one a tuned amplifier sensitive to the frequencies of the Touch Tone signal for the digit 9 and another sensitive to dial pulses.

In any event, the coincidence of signals from delay unit DU2 and voice detector VD2 at AND-circuit G2 sets flip-flop F2 which alerts the operator position OP. At the same time the inverted output of flip-flop F2 blocks AND-circuit G1. Thus, the pulse from delay unit DU2 resets flip-flop F1 as described above. However, no pulse is fed via line D to control unit CU for dropping out the line seizure relay.

When the operator position OP was alerted it basically signaled the answer service operator to plug into the circuit and take the message from the caller. When the operator does plug in, she is connected across the voice bus VB and relay K is energized causing the voltage V to be transmitted via line C to control unit CU, and to the reset input of flip-flop F2 which is reset. The signal on line C causes control unit CU to drop the line seizure relay. However, with the operator on the line the circuits remain open until she pulls the plug from the jack.

The control unit CU is shown in FIG. 2 comprising the shaping circuit ST which can be a Schmitt trigger circuit for shaping the ringing signals received from lines C1 and C2 from the coupler CP. The leading edge of each pulse from shaping circuit ST is counted by ringing counter RC which can be a pulse counter which emits a gate voltage after three input pulses and which is cleared by a pulse received at its clear input C. The output of shaping circuit ST is also fed to the input of delay unit DU3 which can be a monostable multivibrator for emitting a pulse after a period of time greater than the time for four ringing signals. Thus, whenever a ringing signal is sensed the counter will be cleared four ring times later. In this way, the counter will never contain any count at the start of a call. The output of the counter RC is fed to one input of each of the AND-gates G3 and G4. The second input of AND-gate G3 is connected via line B to the announce unit AU as an interlock. The output of AND-circuit G3 is connected to the set input of flip-flop F3 whose direct output is connected to the second input of AND-circuit G4. Thus when the third ring has been sensed flip-flop F3 is set so that the pulse associated with the fourth ring is fed out on line A connected to the output of AND-circuit G4. Note that the setting of flip-flop F3 feeds signals on line J and K to the coupler CP to energize the line seizure relay. The flip-flop F3 is set by signals from the output of OR-circuit B1 whose inputs are connected to lines C and D respectively.

The announcing unit AU centers around a tape recorder having an endless loop of tape TL which is driven by motor MO past magnetic head MH. The tape loop comprises a magnetic tape upon which is recorded the announcement for the call. Spliced into the tape is a section of metal foil which is sensed by foil detector FD to emit a signal. The message starts just past the section of metal foil.

When the announce unit AU receives a signal on line A from control unit CU, it sets flip-flop F4 which starts motor MO and opens AND-gate G5. The recording on the tape loop TL is fed from magnetic head MH via amplifier A1 through AND-circuit G5 to audio amplifier A2 whose outputs are connected to the voice bus VB (FIG. 1) and to the input of tuned amplifier A3. At the end of the message there is recorded on the tape a first tone having a characteristic frequency. The amplifier A3 is tuned to this frequency and thus passes a signal on line E to flip-flop F1 (FIG. 1).

The operator position OP is shown in FIG. 4. Associated with each subscriber to the service is a position of a PBX as well as a light. Thus when the caller wants to give a message to the operator, a signal is received on line M which lights the light L associated with the called subscriber and energizes buzzer BZ. The answer service operator responds by inserting her plug P into the jack J associated with the called subscriber. The operator can now converse with the caller in the usual manner.

While only one embodiment of the invention has been shown and described in detail there will now be obvious to those skilled in the art many modifications and variations satisfying many or all of the objects of the invention without departing from the spirit thereof as defined by the appended claims.

What is claimed is:

1. A telephone answering apparatus connected to an answer service operator position so that an answer service operator can converse with a calling party, and to a subscriber's line in parallel with the subscriber's telephone instrument which receives ringing signals when called and receives voice and characteristic signals after a call has been established, said apparatus comprising ringing signal sensing means for generating an indicator signal when a given number of consecutive ringing signals occur on the subscriber's line within a given period of time, announcing means activated by the occurrence of the indicator signal for transmitting an announcement and a first tone after the announcement to the subscriber's line, a message recording means connected to the subscriber's line for recording voice signal messages, means for activating said message recording means after the transmission of the first tone, means responsive to the absence of voice signals on the subscriber's line for a given time after the occurrence of the first tone for transmitting a second tone to the subscriber's line and for deactivating said message recording means, and sensing means responsive to the presence of a characteristic signal on the subscriber's line after the occurrence of the second tone for transmitting calling signals to the answer service operator position to instruct the answer service operator to converse with a calling party.

2. The telephone apparatus of claim 1 wherein said sensing means includes a voice frequency detector.

3. The telephone apparatus of claim 1 wherein said announcing means includes an endless loop magnetic tape playback device.

4. The telephone apparatus of claim 1 wherein the first tone is recorded on the endless loop of magnetic tape.

* * * * *